US008840687B2

(12) United States Patent
Gadkaree et al.

(10) Patent No.: US 8,840,687 B2
(45) Date of Patent: Sep. 23, 2014

(54) DUAL-LAYER METHOD OF FABRICATING ULTRACAPACITOR CURRENT COLLECTORS

(75) Inventors: Kishor Purushottam Gadkaree, Painted Post, NY (US); Felipe Miguel Joos, Painted Post, NY (US); James Robert Lim, Painted Post, NY (US); Kamjula Pattabhirami Reddy, Corning, NY (US)

(73) Assignee: Corning Incorporated, Corning, NY (US)

( * ) Notice: Subject to any disclaimer, the term of this patent is extended or adjusted under 35 U.S.C. 154(b) by 356 days.

(21) Appl. No.: 12/860,995

(22) Filed: Aug. 23, 2010

(65) Prior Publication Data

US 2012/0043120 A1 Feb. 23, 2012

(51) Int. Cl.
*H01M 4/82* (2006.01)
*H01G 9/04* (2006.01)
*H01G 11/70* (2013.01)
*H01G 11/32* (2013.01)
*H01G 9/00* (2006.01)
*H01G 11/28* (2013.01)
*H01G 9/008* (2006.01)
*H01G 11/84* (2013.01)

(52) U.S. Cl.
CPC ............... *H01G 9/016* (2013.01); *Y02E 60/13* (2013.01); *H01G 9/058* (2013.01); *H01G 11/70* (2013.01); *H01G 11/32* (2013.01); *H01G 9/0029* (2013.01); *Y02T 10/7022* (2013.01); *H01G 11/28* (2013.01); *H01G 11/84* (2013.01)
USPC .... 29/623.4; 29/623.1; 29/623.2; 429/231.95

(58) Field of Classification Search
CPC .............. H01G 4/30; H01G 13/00–13/006; H01G 9/008–9/016; H01G 9/048; H01G 9/058; H01G 11/24; H01G 11/28; H01G 11/40; H01G 11/74–11/78
USPC ............. 29/25.41–25.42, 830–831, 29/623.1–623.7; 429/211, 209; 427/58; 156/306.3
See application file for complete search history.

(56) References Cited

U.S. PATENT DOCUMENTS 2,761,417 A  9/1956  Russell et al. ............... 118/410
2,761,418 A  9/1956  Russell et al. ............... 118/410

(Continued)

FOREIGN PATENT DOCUMENTS

EP  1 833 065 A1  9/2007
WO  2007/116244  10/2007  .............. H01G 9/00
WO  2009-139493 A1  11/2009

OTHER PUBLICATIONS

"The instability in two-layer slot coating flows"; Nam et al; Presented at the 14th International Coating Science and Technology Symposium, Sep. 7-10, 2008, Marina del Rey, California.

*Primary Examiner* — Minh Trinh
(74) *Attorney, Agent, or Firm* — Michael W Russell

(57) ABSTRACT

A method of making a multi-layer current collector comprises forming a first layer from a first formulation over each major surface of a current collector substrate, and forming a second layer from a second formulation over each of the first layers, wherein one of the first formulation and second formulation is a graphite formulation and the other of the first formulation and second formulation is a carbon black formulation.

17 Claims, 1 Drawing Sheet

(56) References Cited

U.S. PATENT DOCUMENTS

| | | | |
|---|---|---|---|
| 3,413,143 A * | 11/1968 | Wills et al. | 427/402 |
| 4,001,024 A | 1/1977 | Dittman et al. | 96/87 |
| 5,286,415 A | 2/1994 | Buckley et al. | 252/502 |
| 5,478,676 A | 12/1995 | Turi et al. | 429/234 |
| 5,849,371 A | 12/1998 | Beesley | 427/566 |
| 6,072,692 A | 6/2000 | Hiratsuka et al. | 361/502 |
| 6,304,426 B1 | 10/2001 | Wei et al. | 361/502 |
| 6,358,650 B2 | 3/2002 | McLin et al. | 429/245 |
| 6,403,263 B1 | 6/2002 | Roach | 429/233 |
| 6,447,555 B1 | 9/2002 | Okamura et al. | 29/25.03 |
| 6,487,066 B1 | 11/2002 | Niiori et al. | 361/502 |
| 6,493,210 B2 | 12/2002 | Nonaka et al. | 361/502 |
| 6,565,701 B1 | 5/2003 | Jerabek et al. | 156/305 |
| 6,714,391 B2 | 3/2004 | Wilk et al. | 361/15 |
| 6,738,252 B2 | 5/2004 | Okamura et al. | 361/502 |
| 6,758,868 B2 * | 7/2004 | Munshi | 29/25.03 |
| 7,095,603 B2 | 8/2006 | Mahon et al. | 361/502 |
| 7,195,834 B2 * | 3/2007 | Srinivas | 429/492 |
| 7,206,190 B2 | 4/2007 | Murakami et al. | 361/502 |
| 7,352,558 B2 | 4/2008 | Zhong et al. | 361/502 |
| 7,377,948 B2 * | 5/2008 | Faris | 29/623.1 |
| 7,382,602 B2 | 6/2008 | Sakata et al. | 361/502 |
| 7,394,648 B2 | 7/2008 | Kondo et al. | 361/502 |
| 7,413,683 B2 * | 8/2008 | Bollepalli | 252/500 |
| 7,459,103 B2 * | 12/2008 | Srinivas | 252/500 |
| 7,508,651 B2 | 3/2009 | Mitchell et al. | 361/517 |
| 7,583,494 B2 | 9/2009 | Maeshima | 361/502 |
| 7,722,686 B2 * | 5/2010 | Xi et al. | 29/623.3 |
| 7,881,042 B2 * | 2/2011 | Buiel et al. | 361/502 |
| 2005/0266298 A1 | 12/2005 | Mitchell et al. | 429/44 |
| 2005/0271798 A1 | 12/2005 | Zhong et al. | 427/58 |
| 2006/0148191 A1 | 7/2006 | Mitchell et al. | 438/396 |
| 2008/0100990 A1 | 5/2008 | Buiel et al. | |
| 2008/0151472 A1 | 6/2008 | Maletin et al. | |
| 2009/0095409 A1 | 4/2009 | Schrooten et al. | 156/153 |
| 2010/0053844 A1 | 3/2010 | Eilertsen | 361/502 |
| 2010/0151328 A1 | 6/2010 | Gadkaree et al. | 429/231.8 |
| 2012/0064399 A1 * | 3/2012 | Carlson | 429/209 |
| 2012/0064404 A1 * | 3/2012 | Carlson | 429/211 |

* cited by examiner

DUAL-LAYER METHOD OF FABRICATING ULTRACAPACITOR CURRENT COLLECTORS

FIELD OF THE DISCLOSURE

The disclosure relates to methods of making current collectors and related method of making ultracapacitor electrodes. In particular, the disclosure relates to methods of making multi-layer, composite current collectors comprising forming a first layer from a first formulation over each major surface of a current collector substrate, and forming a second layer from a second formulation over each first layer. In various embodiments, one of the first formulation and second formulation is a graphite formulation, and the other of the first formulation and second formulation is a carbon black formulation. The disclosure further relates to methods of making ultracapacitor electrodes comprising the multi-layer current collector formation methods described herein.

BACKGROUND

Multi-layer, composite current collectors may be used, for example, in electrodes for ultracapacitors, also known as electrochemical double layer capacitors ("EDLCs"), which are electrochemical devices that have highly reversible charge-storage and charge-delivery processes per unit volume and unit weight as compared to batteries. Ultracapacitors may also be desirable because they may not contain hazardous or toxic materials and, therefore, may be easy to dispose of. Additionally, they may be utilized in large temperature ranges, and they have demonstrated cycle lives in excess of 500,000 cycles. Ultracapacitors may be used in a broad spectrum of applications such as, for example, fail-safe positioning in case of power failures, portable electronics, and electric vehicles.

In an ultracapacitor, electrons conduct electricity to and from each of the two electrodes through an external circuit, while ions flow in between the electrodes. Many intrinsic and extrinsic components of an ultracapacitor device contribute to the overall equivalent series resistance, including the electrode resistance at the interface between the active material and the current collector. Reduction in the electrode interfacial resistance may reduce the equivalent series resistance and increase the power density for the ultracapacitor device. Incompatibility among elements comprising an intermediary coating at the current collector interface may, however, cause difficulties in making multi-layer current collectors and ultracapacitor electrodes.

Thus, there exists a need for methods of making multi-layer current collectors with the desired microstructure, thickness and composition. There further exists a need for methods of making multi-layer current collectors and ultracapacitor electrodes that reduce the electrode interfacial resistance and improve the performance of the ultracapacitor. There is also a need for methods of making multi-layer current collectors and ultracapacitor electrodes in a cost effective manner, e.g., reducing material costs and/or manufacturing time.

SUMMARY

In accordance with the detailed description and various exemplary embodiments described herein, the disclosure relates to methods of making multi-layer composite current collectors and related methods of making ultracapacitor electrodes.

In various exemplary embodiments, the disclosure relates to methods of making multi-layer current collectors comprising forming a first layer from a first formulation over each major surface of a current collector substrate, and forming a second layer from a second formulation over each of the first layers. In further embodiments, one of the first formulation and second formulation is a graphite formulation and the other of the first formulation and second formulation is a carbon black formulation.

The disclosure also relates to a multi-layer current collector that comprises a current collector substrate and a composite layer formed over each major surface of the current collector substrate. In the multi-layer current collector, the composite layer comprises both graphite and carbon black, and a ratio of graphite to total solids in the composite layers is from about 2 to 50 vol. %.

Other embodiments of the disclosure relate to methods of making ultracapacitor electrodes comprising the methods of making multi-layer current collectors disclosed herein.

BRIEF DESCRIPTION OF THE DRAWINGS

The accompanying drawings are included to provide a further understanding of the invention, and are incorporated in and constitute a part of this specification. The drawings are not intended to be restrictive of the invention as claimed, but rather are provided to illustrate exemplary embodiments of the invention and, together with the description, serve to explain the principles of the invention.

DETAILED DESCRIPTION

Figure 1:
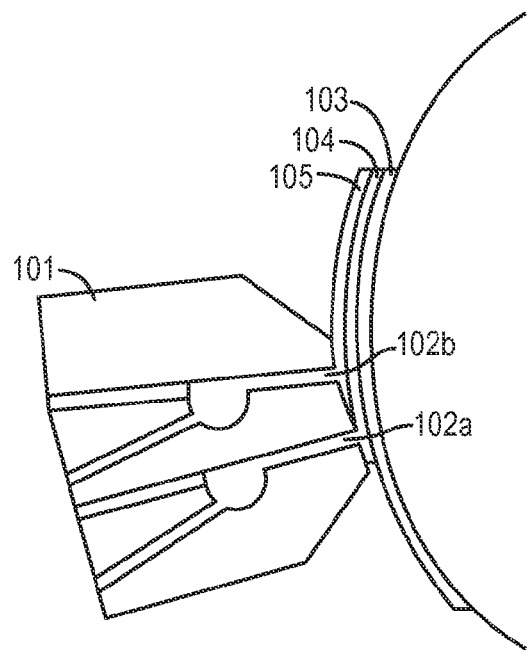
FIG. 1 is a schematic representation of forming a first and second layer on a current collector substrate using a double slot die according to at least one embodiment of the disclosure.

It is to be understood that both the foregoing general description and the following detailed description are exemplary and explanatory only and are not restrictive of the invention as claimed. Other embodiments will be apparent to those skilled in the art from consideration of the specification and practice of the embodiments disclosed herein. It is intended that the specification and examples be considered as exemplary only, with the true scope and spirit of the invention being indicated by the claims.

As used herein the use of "the," "a," or "an" means "at least one," and should not be limited to "only one" unless explicitly indicated to the contrary. Thus, for example, the use of "the carbon black material" or "a carbon black material" is intended to mean at least one carbon black material.

The disclosure relates, in various embodiments, to methods of making multi-layer current collectors comprising forming a first layer from a first formulation over each major surface of a current collector substrate and forming a second layer from a second formulation over each of the first layers.

As used herein, the term "current collector substrate," and variations thereof, is intended to mean a substrate having two major opposing surfaces or sides (e.g., first and second surfaces). The substrate may, in various embodiments, comprise a metal, such as, for example, aluminum, titanium, nickel, copper, tin, tungsten, molybdenum, steel, stainless steel, alloys, and combinations of metals, such as combinations of metals with platings (i.e., gold or platinum). In at least one embodiment, the current collector substrate may be comprised of aluminum sheet.

The substrate may, in various embodiments, further comprise insulating materials, such as, but not limited to, glass, polymers, or other organic components or compounds with a conductive surface or coating such as ITO, a tin-doped indium oxide conductive polymer, and graphene sheet or sheets or a combination thereof.

In various embodiments, the thickness of the current collector substrate may range from 5 to 100 microns, for example from 15 to 40 microns, or 20 to 30 microns, such as 25 microns.

As used herein, the term "layer" is intended to mean a thickness of a material or formulation over a surface, partially or substantially completely covering the surface. As disclosed herein, the first layer is disposed between the current collector substrate and the second layer. In various embodiments, one of the first layer and second layer is a graphite layer, and the other of the first layer and second layer is a carbon black layer.

As used herein, the term "formulation" is intended to mean a composition which may be viscous and capable of forming a layer on or over a current collector substrate. The first formulation disclosed herein forms the first layer, and the second formulation disclosed herein forms the second layer. In various embodiments, one of the first formulation and the second formulation is a graphite formulation and the other of the first formulation and second formulation is a carbon black formulation.

As used herein, the term "graphite layer" is intended to mean a layer comprising at least one graphite material. Graphite materials useful in the graphite layer include natural and synthetic graphite. Non-limiting examples of graphite materials include, but are not limited to, those in the form of powders, for example those marketed as grades 4827, TC307, UF440, and 3442 by Asbury Carbon, Inc., of Asbury, N.J., and UFG5 by Showa Denko Carbon, Inc., of Ridgeville, S.C. Graphite materials may also be delivered in dispersions or inks, for example those marketed under the trade names GRAPHOKOTE® 572 and AQUAKAST® 2 by Asbury Carbon, Inc., of Asbury, N.J., and LUBRODAL® EC 1204B and HYDROGRAF® A M2 by Fuchs Lubritech GMBH of Kaiserslautern, Germany.

In various embodiments, the graphite material described herein may have an average particle diameter ranging from 0.1 μm to 100 μm, such as from 0.1 to 10 μm.

In various embodiments, the graphite layer may be formed from a graphite formulation comprising the graphite material, such as, but not limited to, a dispersion or supernatant of graphite material in deionized water. For example, the graphite formulation may be in the form of a dispersion comprising a graphite ink diluted in deionized water. In another exemplary embodiment, the graphite formulation may be in the form of a supernatant where graphite is mixed in a solution, and the graphite allowed to settle for a period such that the supernatant may be used. It is within the ability of one skilled in the art to determine parameters such as the appropriate dilution and/or settling time based on, for example, the graphite material selected and the desired percentage of solids in the graphite layer.

In various embodiments, the graphite formulation may comprise from 1 to 20 wt. % graphite material or solids, for example from 5 to 15 wt. %, such as 13 wt. %.

In various embodiments, during the formation of the graphite layer, the graphite formulation may have a viscosity of less than 300 cps, for example less than 150 cps, less than 80 cps, less than 60 cps, or less than 40 cps.

In various embodiments, the graphite formulation may further comprise at least one binder. As used herein, binders include, but are not limited to, polytetrafluoroethylene (PTFE), polyvinylidene fluoride (PVDF), polyvinylpyrrolidone (PVP), polyvinyl acetate (PVA), polyethylene oxide (PEO), polypropylene, polyethylene, polyurethane, polyacrylates, and other organic (yet chemically and electrochemically inert) binders. In at least one embodiment, the binder may be a combination of PVP and polyacrylates.

In various embodiments, the binder may comprise from 0 to 50 wt. % of the graphite formulation, for example 0.1 to 49 wt. %, and 1 to 40 wt. %, such as 5 wt. %.

In various embodiments, the graphite formulation may further comprise at least one additional conduction enhancing agent, such as, for example, metallic nanotubes, rods, and wires; carbon nanotubes, rods, and wires; graphene particles; conductive nanoparticles; and conductive polymers.

In various embodiments, the additional conduction enhancing agent may comprise from 0.01 to 50 wt. % of the graphite formulation, for example 0.1 to 49 wt. %, 5 to 20 wt. %, such as 10 wt. %.

Once formed on the substrate, the thickness of the graphite layer may, in various embodiments, range from 0.01 micron to 10 microns, such as 0.1 micron to 2 or 5 microns. In various embodiments, the graphite layer may be uniform in thickness on the substrate, and in others it may not be uniform in thickness.

As used herein, the term "carbon black layer" is intended to mean a layer comprising at least one carbon black material. Carbon black materials useful in the carbon black layer include, but are not limited to, those in the form of powders, for example those marketed under the trade names BLACK PEARLS® 2000 by Cabot Corporation of Boston, Mass., VULCAN® XC 72 by Cabot Corporation of Boston, Mass., and PRINTEX® L6 by Evonik of Essen, Germany; and those in the form of granules, for example those marketed under the trade names ENSACO® 250G, 250P, 260G, and 350G by Timcal Limited of Bodio, Switzerland. Carbon black materials may also be delivered in dispersions or inks, for example those marketed under the trade names AJACK® Black 99 and 7983 by Solution Dispersions of Cynthiana, Ky.

In various embodiments, the carbon black material useful in the carbon black layer described herein may have an average particle diameter ranging from 0.005 to 0.1 μm, such as from 0.01 to 0.05 μm, with an average agglomerate diameter ranging from 1 to 100 μm, such as from 5 to 30 μm.

In various embodiments, the carbon black layer may be formed from a carbon black formulation comprising the carbon black material, such as, but not limited to, a dispersion or supernatant of carbon black material in deionized water. For example, the carbon black formulation may comprise a carbon black ink diluted in deionized water and the carbon black may be allowed to settle for a period such that the supernatant may be used. In another exemplary embodiment, the carbon black formulation may be in the form of a dispersion comprising a carbon black ink diluted in deionized water. It is within the ability of one skilled in the art to determine parameters such as the appropriate dilution and settling time based on, for example, the carbon black material selected and the desired percentage of solids in the carbon black layer.

In various embodiments, the carbon black formulation may comprise from 1 to 20 wt. % carbon black material or solids, for example from 5 to 15 wt. %, such as 12 wt. %.

In various embodiments, during the formation of the carbon black layer, the carbon black formulation may have a viscosity of less than 30 cps, for example less than 20 cps, less than 10 cps, or less than 6 cps.

In various embodiments, the carbon black formulation may further comprise at least one binder as described herein. In at least one embodiment, the binder may be a combination of PVP and polyacrylates. In various embodiments, the binder may comprise from 0.01 to 50 wt. % of the carbon black formulation, for example from 0.1 to 49 wt. %, from 1 to 40 wt. %, or from 5 to 25%, such as 15 wt. %.

In various embodiments, the carbon black formulation may further comprise at least one additional conduction enhancing agent, such as, for example, metallic nanotubes, rods, and wires; carbon nanotubes, rods, and wires; graphene particles; conductive nanoparticles; and conductive polymers.

In various embodiments, the additional conduction enhancing agent may comprise from 0.01 to 50 wt. % of the carbon black formulation, for example from 0.1 to 49 wt. %, or from 5 to 20 wt. %, such as 10 wt. %.

Once formed on the substrate, the thickness of the carbon black layer may range from 0.01 to 10 microns, e.g., 1 to 2 or 5 microns. In various embodiments, the carbon black layer may be uniform in thickness on the substrate, and in others it may not be uniform in thickness.

In at least one embodiment, the first layer is a graphite layer and the second layer is a carbon black layer.

In accordance with the method disclosed herein, the first layer and second layer may be formed using techniques such as, but not limited to, slot die coating, slide bead, and curtain coating. In various embodiments, the first layer and second layer may be formed using the same or different techniques. In at least one embodiment, the first and second layers may each be formed using a slot die coating technique.

In various embodiments, the first layer and second layer may be formed one at a time or separately, i.e., the first layer formed and then the second layer formed, or they may be formed substantially simultaneously.

In at least one embodiment, the first layer and second layer may be formed substantially simultaneously using a slot die, for example a double slot die. In such an embodiment, formulations corresponding to each layer may merge in the slot and then be delivered together onto the current collector substrate. Alternatively, the two formulations may emerge from the slot die separately into a common bead when applied on the current collector substrate. In further embodiments, there may be mixing of the formulations during formation of the first and second layers.

It is within the ability of one skilled in the art to select the parameters for forming the first layer and second layer, such as, for example, the appropriate coating speed, flow rates of the layer formulation(s), shim thickness, drying conditions, and gap distance of the coating die lip and the coating surface, to achieve the desired properties of the layer(s).

A ratio (vol. %) of graphite to total solids in the first and second layers can range from 2 to 50 vol. %. The total solids can include graphite and carbon black as well as any optional additives. In an embodiment, a ratio of graphite to total solids can range from 10 to 30 vol. %.

Disclosed herein is a multi-layer forming technique for forming a composite layer over a current collector substrate where the composite layer includes both graphite and carbon black. Applicants believe that the overall composition of the composite layer would be difficult to achieve using conventional forming techniques. Notably, forming a composite layer composition comprising 2-50 vol. %, e.g., 10-30 vol. % graphite using a single formulation that comprises both graphite and carbon black is challenging from a number of perspectives, including stability of the dispersion, handling and manufacturability. By incorporating the graphite and carbon black constituents into separate formulations, challenges associated with the compatibility of the two constituents in a single formulation can be overcome.

FIG. 1 is a schematic representation of forming a first and second layer on a current collector substrate using a double slot die according to at least one embodiment of the disclosure. The coating die 101 has two slots 102a and 102b. The first formulation exits the die at the first slot 102a and forms the first layer 104 on the current collector substrate 103. Meanwhile, the second formulation substantially simultaneously exits the die at the second slot 102b and forms the second layer 105 on the first layer 104.

In various exemplary embodiments, the first layer may be formed in direct contact with the current collector substrate. In further exemplary embodiments, the second layer may be formed in direct contact with the first layer. By way of example only, in one embodiment the first layer may be a graphite layer in direct contact with the current collector substrate, and the second layer may be a carbon black layer in direct contact with the graphite layer.

In various embodiments, the method may further comprise forming at least one additional layer. The additional layer may be formed before the first layer, between the first and second layer, or over the second layer. By way of example only, in one embodiment the additional layer may be formed in direct contact with the current collector substrate.

The additional layer may comprise additional materials, such as conduction enhancing agents, or it may comprise substantially all deionized water. A conduction enhancing agent may include metallic nanotubes, rods, and wires; carbon nanotubes, rods, and wires; graphene particles; conductive nanoparticles; and conductive polymers. In at least one embodiment, the additional layer may be deionized water and may be formed in direct contact with the current collector substrate.

In various embodiments, the additional layer may be formed from a formulation comprising from 0.01 to 50 wt. % of a conduction enhancing agent, for example 0.1 to 49 wt. %, or 5 to 20 wt. %, such as 13 wt. %.

In various embodiments, an additional layer may be formed using the methods described herein, and may be formed at substantially the same time as one or both of the first layer and second layer, or may be formed in sequence with one or both of the first layer and second layer. By way of example only, in one embodiment the additional layer may be formed substantially simultaneously with the first layer and second layer, for example with a slot die, such as a triple slot die.

In various embodiments, the method may further comprise drying the first layer and/or second layer on either or both of the major surfaces of the current collector substrate. By way of example only, in one embodiment, first layers can be formed on each major surface of the current collector substrate and then dried before forming respective second layers over the first layers. In various further embodiments, each second layer may then be dried. In another embodiment, a first layer and a second layer can be formed on a first surface of the current collector substrate and then dried before forming a first layer and a second layer on the second surface of the substrate.

As used herein, drying is the process of solidifying the wet coating by removal of solvent or liquid medium. Drying may done using methods such as, but not limited to, in-line ovens, infrared (IR), or microwave. The first layer, second layer, or combination may be dried using the same or different methods. By way of example only, in one embodiment, the first and second layers may be dried using in-line ovens. It is within the ability of one skilled in the art to select the appropriate drying method(s) and parameters.

Figure 2:
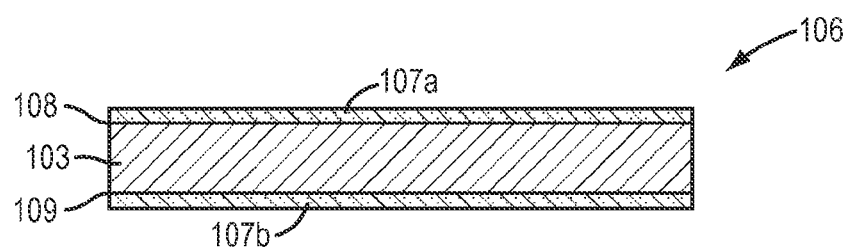
FIG. 2 is a representative cross-section of a multi-layer current collector made according to at least one embodiment of the disclosure.

FIG. 2 is a representative cross-section of a multi-layer current collector made according to at least one embodiment of the disclosure. The multi-layer current collector 106 has dried graphite and carbon black composite layers 107a on a first surface 108 of the substrate 103 and dried graphite and carbon black composite layers 107b on a second surface 109 of the substrate 103.

The present disclosure further relates to multi-layer current collectors comprising a graphite layer and a carbon black layer and/or a composite layer on both of the major surfaces of a current collector substrate.

As used herein, a "composite layer" is intended to mean a region where the carbon black layer and graphite layer have combined or mixed. The composite layer may be disposed between the graphite layer and the carbon black layer.

In various embodiments, the graphite layer may comprise from 0 to 99% of the overall thickness of the combined layers (i.e., graphite, carbon black and composite layers) on one or both major surfaces of a current collector substrate, for example from 10-90%, 20-80%, 30-70%, or 40-60%.

In various embodiments, the carbon black layer may comprise from 0 to 99% of the overall thickness of the combined layers on one or both major surfaces of a current collector substrate, for example from 10-90%, 20-80%, 30-70%, or 40-60%.

In various embodiments, there may be substantially no mixing of the graphite and carbon black layers, and a composite layer may not be present. In other embodiments, there may be some degree of mixing of the graphite layer and carbon black layer to form a composite layer such that the composite layer may comprise up to 100% of the overall thickness of the combined layers on one or both major surfaces of a current collector substrate, for example from 10-90%, 20-80%, 30-70%, or 40-60%.

When a composite layer is present, the degree to which the graphite layer and carbon black layers are retained may vary independently. In various embodiments, a portion of the graphite layer may be retained while the graphite layer may be eliminated and substantially completely consumed by the composite layer. Likewise, in various embodiments, a portion of the carbon black layer may be retained while the carbon black layer may be eliminated and substantially completely consumed by the composite layer. In various embodiments, the graphite layer may comprise from 10 to 40%, the carbon black layer may comprise from 10 to 40%, and the composite layer may comprise from 20 to 80% of the total layer thickness.

The present disclosure further relates to methods for making an ultracapacitor electrode, wherein the methods comprise forming a first layer from a first formulation over each major surface of a current collector substrate, forming a second layer from a second formulation over each first layer, and forming at least one activated carbon layer over respective second layers. In embodiments, one of the first formulation and second formulation is a graphite formulation, and the other of the first formulation and second formulation is a carbon black formulation.

In accordance with the disclosure above, the first layer and second layer may be formed using techniques such as, but not limited to, slot die coating, slide bead, and curtain coating. In various embodiments, the first layer and second layer may be formed using the same or different techniques. In at least one embodiment, the first and second layers may be formed using a slot die coating technique.

In various embodiments, the first layer and second layer may be formed one at a time or separately, i.e., the first layer formed and then the second layer formed, or they may be formed substantially simultaneously.

In at least one embodiment, the first layer and second layer may be formed substantially simultaneously using a slot die, for example a double slot die. In such an embodiment, the two layers may merge in the slot and then be delivered together onto the current collector substrate. Alternatively, the two layers may emerge from the slot die separately into a common bead when applied on the current collector substrate.

It is within the ability of one skilled in the art to select the parameters for forming the first layer and second layer to the substrate, such as, for example, the appropriate coating speed, flow rates of the layer formulation(s), shim thickness, drying conditions, and gap distance of the coating die lip and the coating surface, to achieve the desired properties of the layer(s).

In various exemplary embodiments, the first layer may be formed in direct contact with the current collector substrate. In further exemplary embodiments, the second layer may be formed in direct contact with the first layer. By way of example only, in one embodiment the first layer may be a graphite layer in direct contact with the current collector substrate, and the second layer may be a carbon black layer in direct contact with the first layer.

As also described above, the method may further comprise forming at least one additional layer on the substrate. The additional layer may be formed before the first layer, between the first and second layer, or over the second layer. By way of example only, in one embodiment the additional layer may be formed in direct contact with the current collector substrate.

In various embodiments, an additional layer may be formed using the methods described herein, and may be formed at substantially the same time as one or both of the first layer and second layer, or may be formed in sequence with one or both of the first layer and second layer. By way of example only, in one embodiment the additional layer may be formed substantially simultaneously with the first layer and second layer, for example with a slot die, such as a triple slot die.

As described above, drying the first layer and second layer may be done using methods such as, but not limited to, in-line ovens, infrared (IR), or microwave. The first layer and second layer may be dried using the same or different methods. By way of example only, in one embodiment, the first and second layers may be dried using in-line ovens. It is within the ability of one skilled in the art to select the appropriate drying method(s) and parameters. As also described above, the first layer and second layer on each major surface of the current collector substrate may be dried separately, together, or in combinations thereof.

At least one activated carbon layer is formed over the second layer on each side of the current collector. As used herein, the term "activated carbon layer" is intended to mean a layer of an activated carbon formulation comprising at least one activated carbon material. Activated carbon materials useful in the activated carbon formulations include, but are not limited to, carbon that has been processed to make it extremely porous and, thus, to have a high specific surface area. For example, activated carbon may be characterized by a high BET specific surface area ranging from 300 to 2500 $m^2/g$. Activated carbon materials useful in the activated carbon formulations described herein include, but are not limited to, those marketed under Activated Carbon by Kuraray Chemical Company Ltd, of Osaka, Japan, Carbon Activated Corporation of Compton, Calif., and General Carbon Corporation of Paterson, N.J. Other suitable activated carbon materials are those disclosed in commonly owned U.S. application Ser. No. 12/335,044, now U.S. Pat. No. 8,318,356 and 61/297,469, the entire contents of which are incorporated herein by reference.

In various embodiments, the activated carbon may comprise from 0.1 to 100 wt. % of the activated carbon formulation, for example from 1 to 99 wt. %, or from 10-90 wt. %, such as 85 wt. %.

In various embodiments, the activated carbon formulation may further comprise at least one binder as described herein. As used herein, binders include, but are not limited to, polytetrafluoroethylene (PTFE), polyvinylidene fluoride (PVDF), polyvinylpyrrolidone (PVP), polyvinyl acetate (PVA), polyethylene oxide (PEO), polypropylene, polyethylene, polyurethane, polyacrylates, and other organic (yet chemically and electrochemically inert) binders. In at least one embodiment, the binder may be PTFE. In various embodiments, the binder may comprise from 0.01 to 50 wt. % of the activated carbon formulation, for example from 0.1 to 49 wt. %, or from 1 to 40 wt. %, such as 10 wt. %.

In various embodiments, the activated carbon formulation may further comprise at least one conduction enhancing agent, such as, for example, carbon black; metallic nanotubes, rods, and wires; carbon nanotubes, rods, and wires; graphene particles; graphite (natural or synthetic); conductive nanoparticles; and conductive polymers. In at least one embodiment, the conduction enhancing agent may be carbon black. The conduction enhancing agent may comprise from 0.01 to 50 wt. % of the activated carbon formulation, for example 0.1 to 49 wt. % or from 1 to 45 wt. %, such as 5 wt. %.

Once applied to the substrate, the thickness of the activated carbon layer may range from 100 nm to 5 mm, for example from 0.25 μm to 200 μm, or from 500 nm to 150 μm. In various embodiments, the activated carbon layer may be uniform in thickness on the substrate, and in others it may not be uniform in thickness.

It is within the ability of one skilled in the art to select an appropriate method for forming the activated carbon layer, including for example, lamination methods, gravure methods, slot die or extrusion methods, tape-casting methods, common roller methods, pressing, or a combination thereof.

Figure 3:
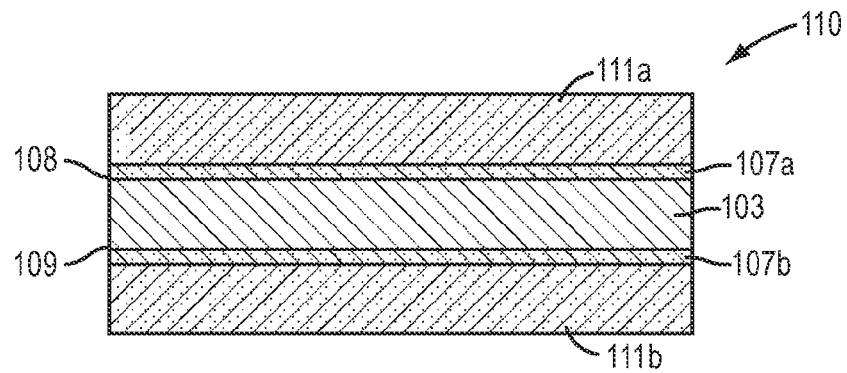
FIG. 3 is a representative cross-section of a portion of an ultracapacitor electrode made according to at least one embodiment of the disclosure.

FIG. 3 is a representative cross-section of a portion of an ultracapacitor electrode made according to at least one embodiment of the disclosure. The ultracapacitor electrode 110 has an activated carbon layer 111a over the first and second layer 107a on a first surface 108 of the substrate 103 and an activated carbon layer 111b over the first and second layer 107b on a second surface 109 of the substrate 103.

In various non-limiting exemplary embodiments, the methods of the disclosure utilize two formulations for forming the graphite and carbon black layers, which may be more stable than one formulation comprising the carbon black and graphite materials. Thus, the methods of the disclosure may more reliably make products having consistent properties over various batches or runs. The methods described herein may also allow the microstructure, thickness, and composition of the graphite and carbon black layers to be varied by changing the composition of the formulations used in the various layers.

In various embodiments, the methods of the disclosure may produce multi-layer current collectors and/or ultracapacitor electrodes maintaining or reducing the interfacial resistances between an activated carbon layer and the current collector substrate, relative to products obtained by methods currently known in the field. In further embodiments, the methods may produce multi-layer current collectors and/or ultracapacitor electrodes equally or more thermally robust, relative to products obtained by methods currently known in the field.

In various embodiments, the methods of the disclosure may produce multi-layer current collectors and/or ultracapacitor electrodes at a higher speed than methods currently known in the art.

Unless otherwise indicated, all numbers used in the specification and claims are to be understood as being modified in all instances by the term "about," whether or not so stated. It should also be understood that the precise numerical values used in the specification and claims form additional embodiments of the invention. Efforts have been made to ensure the accuracy of the numerical values disclosed in the example. Any measured numerical value, however, can inherently contain certain errors resulting from the standard deviation found in its respective measuring technique.

EXAMPLES

The following examples are not intended to be limiting of the invention as claimed.

Comparative Example

One mil thick aluminum foil (not cleaned or treated) was selected as a current collector substrate. A conductive carbon intermediary coating ink was prepared for dip coating application by hand mixing the coating ink, DAG EB 012 from Henkel, for 5 minutes with deionized water in a 1:1 ratio and was used within 2 hours. The substrate was then dip coated in the conductive carbon intermediary coating ink, resulting in both sides of the substrate being coated at the same time. The thicknesses of the conductive intermediary coatings were targeted in the 1 to 3 micron range. The coated substrate was then baked at 105° C. in a convection oven for at least 10 minutes.

The fabricated current collector was then laminated at 200° C. and 250 pounds per linear inch (ph) on both sides with activated carbon sheets. The activated carbon sheets were prepared by mixing activated carbon, Kuraray YP50F from Kuraray Chemical Company Ltd, of Osaka, Japan, with carbon black, BLACK PEARLS® 2000 by Cabot Corporation of Boston, Mass., in an 85:5 ratio. Teflon® PTFE613A by DuPont of Wilmington, Del. was then added to make an 85:5:10 ratio of activated carbon to carbon black to PTFE. Isopropyl alcohol was added to the mixture, mixed and then semi-dried. The material was then pressed into a pre-form about 9 to 10 mil thick. The pre-forms were densified into carbon sheets by systematic calendering to 3 to 5 mils in thickness.

The thru-plane area-specific resistance of the resulting electrode was measured by punching out a 1 3/16-inch diameter disk and measuring (as received) for thru-plane area-specific resistance. An Instron 4202 was used to apply a 100 lb load on the sample, between two ceramic cylinders (diameter=1 in) with silver foil contacts covering each cylinder top. DC four wire resistance measurements were made using a Keithley multimeter 2700, and resistance numbers were then calculated for area-specific resistance.

The samples were then heated in a 150° C. oven for at least 16 hours, allowed to cool down, and then measured again for thru-piane area-specific resistance.

The electrode sample exhibited measured thru-plane area-specific resistance of 0.10 ohm-cm$^2$ (as received) and 0.11 ohm-cm$^2$ after 150° C. exposure for 16 hours. Thus, the conductive carbon intermediary coating demonstrated favorable interfacial resistance properties and thermal stability.

Inventive Example

A first layer formulation (graphite formulation) was prepared using GK572 from Asbury Carbon, Inc., of Asbury, N.J. A 50:50 GK572:deionized water dilution was prepared by mixing for approximately 5 minutes. The mixture remained a stable dispersion.

A second layer formulation (carbon black formulation) was prepared using DAG EB 012 from Henkel. A 60:40 DAG:deionized water dilution was prepared by mixing for approximately 5 minutes and then allowing the mixture to settle for 3 days. On the 3rd day of settling, the supernatant was harvested.

One mil thick aluminum foil (not cleaned or treated) was selected as a current collector substrate and was slot die coated using the first and second layer formulations. First, one side of the substrate was coated using a multi-layer slot die at 22 ft/min line speed. The first formulation flow rate was 1.3 ml/min, using a shim 3 mil thick. The second formulation flow rate was 4.8 ml/min, using a shim 5 mil thick. The coated substrate was then dried through in-line ovens at 239° F.

The other surface of the substrate was then coated with a multi-layer slot-die under the same conditions, and dried in-line at 239° F.

The fabricated current collector was then laminated on both sides with activated carbon sheets as described in Comparative Example above.

Using the method described above, the resulting electrode sample exhibited measured thru-plane area-specific resistance of 0.11 ohm-cm$^2$ (as received) and 0.11 ohm-cm$^2$ after 150° C. exposure for 16 hours.

This data suggests similar conductive intermediary coating properties as the product of Comparative Example 1; however, the method of Inventive Example is a more controlled and versatile method. For example, the ink of Comparative Example only has approximately 2 hours of working lifetime; whereas, the two formulations of the Inventive Example are stable.

What is claimed is:

1. A method for making a multi-layer current collector, the method comprising:
    forming a first layer from a first formulation in direct contact with each major surface of a current collector substrate; and
    forming a second layer from a second formulation in direct contact with each first layer;
    wherein the first formulation is one of a graphite formulation and a carbon black formulation, and the second formulation is the other of a graphite formulation and a carbon black formulation, and the graphite formulation comprises at least one graphite material having an average particle diameter ranging from 0.1 μm to 100 μm.

2. The method of claim 1, further comprising drying each first layer before forming the second layer over each first layer.

3. The method of claim 1, further comprising drying the first layer and the second layer on one major surface of the current collector substrate before forming the first layer and second layer on the other major surface of the current collector substrate.

4. The method of claim 1, wherein the first layer is a graphite layer.

5. The method of claim 1, wherein the carbon black layer is comprised of at least one carbon black material having an average particle diameter ranging from 0.005 μm to 0.1 μm and an average agglomerate diameter ranging from 1 μm to 100 μm.

6. The method of claim 1, wherein during the forming, the carbon black formulation has a viscosity of less than 30 cps.

7. The method of claim 1, wherein during the forming, the graphite formulation has a viscosity of less than 300 cps.

8. The method of claim 1, wherein at least one of the first formulation and second formulation further comprise at least one conductivity enhancing agent.

9. The method of claim 1, further comprising forming at least one additional layer.

10. The method of claim 1, further comprising forming at least one additional layer, wherein the at least one additional layer comprises at least one conductivity enhancing agent.

11. The method of claim 1, wherein the first layer and second layer are formed substantially simultaneously.

12. The method of claim 1, wherein the first layer and second layer are formed substantially simultaneously using a slot-die.

13. The method of claim 1, wherein a ratio of graphite to total solids in the first and second layers is from about 2 to 50 vol. %.

14. A method for making an ultracapacitor electrode; wherein the method comprises:
    forming a first layer from a first formulation in direct contact with each major surface of a current collector substrate;
    forming a second layer from a second formulation in direct contact with each first layer; and
    forming at least one activated carbon layer in direct contact with each second layer;
    wherein the first formulation is one of a graphite formulation and a carbon black formulation, and the second formulation is the other of a graphite formulation and a carbon black formulation, and the graphite formulation comprises at least one graphite material having an average particle diameter ranging from 0.1 μm to 100 μm.

15. The method of claim 14, wherein the first layer is a graphite layer.

16. The method of claim 14, wherein the first layer and second layer are formed substantially simultaneously using a slot-die.

17. The method of claim 14, further comprising drying the first layer and the second layer on one major surface of the current collector substrate before forming the first layer and second layer on the other major surface of the current collector substrate.

* * * * *